(12) United States Patent
Kim et al.

(10) Patent No.: US 10,718,139 B2
(45) Date of Patent: Jul. 21, 2020

(54) COMPONENT-INTEGRATED TAILGATE HANDLE SWITCH FOR VEHICLE

(71) Applicants: Hyundai Motor Company, Seoul (KR); Kia Motors Corporation, Seoul (KR)

(72) Inventors: Ki-Eun Kim, Gyeonggi-do (KR); Seong-Won Yu, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 59 days.

(21) Appl. No.: 16/122,577

(22) Filed: Sep. 5, 2018

(65) Prior Publication Data

US 2019/0112843 A1 Apr. 18, 2019

(30) Foreign Application Priority Data

Oct. 12, 2017 (KR) .......................... 10-2017-0132762

(51) Int. Cl.
| | |
|---|---|
| *B60S 1/58* | (2006.01) |
| *B60S 1/04* | (2006.01) |
| *B60S 1/34* | (2006.01) |
| *E05B 83/16* | (2014.01) |
| *E05B 81/24* | (2014.01) |
| *E05B 65/00* | (2006.01) |
| *E05B 81/76* | (2014.01) |

(Continued)

(52) U.S. Cl.
CPC .............. *E05B 83/16* (2013.01); *B60S 1/583* (2013.01); *E05B 65/0003* (2013.01); *E05B 81/25* (2013.01); *E05B 81/76* (2013.01); *B60S 1/0438* (2013.01); *B60S 1/0491* (2013.01); *B60S 1/349* (2013.01); *E05B 81/13* (2013.01); *E05B 85/10* (2013.01)

(58) Field of Classification Search
CPC ...... B60S 1/583; B60S 1/0491; B60S 1/0438; B60S 1/349; B60S 1/58; E05F 81/13; E05F 81/76; E05F 83/18; E05F 83/16; E05F 85/10; B60J 1/1884; B60J 1/20; B60J 5/101; B60J 5/107
See application file for complete search history.

(56) References Cited

U.S. PATENT DOCUMENTS

2001/0005084 A1* 6/2001 Ponziani .................. B60S 1/04
   296/56
2017/0101062 A1* 4/2017 Kim ...................... H04N 5/2253
(Continued)

FOREIGN PATENT DOCUMENTS

| GB | 1448892 | * | 9/1976 | ................ B60S 1/04 |
| KR | 2012-0058134 A | | 6/2012 | |

*Primary Examiner* — Gregory A Blankenship
(74) *Attorney, Agent, or Firm* — Mintz Levin Cohn Ferris Glovsky and Popeo, P.C.; Peter F. Corless

(57) ABSTRACT

A vehicle is provided that includes a wiper-integrated tailgate handle switch mounted to a window glass of a tailgate. The wiper-integrated tailgate handle switch includes a tailgate handle switch, which is configured to press a current carrying switch arranged in the internal space thereof using the height of an insertion space defined by a difference in height between transverse and longitudinal bodies of a handle switch housing, and a wiper. Therefore, a degree of freedom in design of the tailgate is increased which improves the aesthetic of the tailgate by removing the tailgate handle switch from the tailgate.

17 Claims, 7 Drawing Sheets

(51) Int. Cl.
  *E05B 81/12* (2014.01)
  *E05B 85/10* (2014.01)

(56) References Cited

U.S. PATENT DOCUMENTS

2017/0182979 A1* 6/2017 Kuchly .................. B60S 1/349
2019/0112843 A1* 4/2019 Kim ....................... E05B 81/25

* cited by examiner

SECTION T-T

SECTION L-L

COMPONENT-INTEGRATED TAILGATE HANDLE SWITCH FOR VEHICLE

CROSS-REFERENCE TO RELATED APPLICATION

This application claims priority to Korean Patent Application No. 10-2017-0132762, filed on Oct. 12, 2017, which is incorporated herein by reference in its entirety.

BACKGROUND

Field of the Invention

The present invention relates to a tailgate handle switch; and, more particularly, to a component-integrated tailgate handle switch for a vehicle, capable of increasing a degree of freedom in external design of a tailgate.

Description of Related Art

In general, the tailgate applied to a vehicle functions as a rear door that is opened to load or unload freight into or from the vehicle through a freight compartment in the rear of the vehicle. Accordingly, the tailgate has a switching structure in which a frame installed with a rear window is connected to a hinge, a spring, and a lifter to move up toward the roof of the vehicle.

In particular, the tailgate includes a handle switch that is manually operated outside the vehicle. The handle switch is installed to the tailgate while exposed to the outside for identification to operate the tailgate from the outside. However, it may be difficult for the vehicle having the tailgate to satisfy a demand for high merchantable quality with an improvement in design emerged in recent years since the handle switch exposed to the outside of the tailgate imposes many limitations on providing a desired aesthetic of the tailgate and since the tailgate has a protrusion formed on the smooth curved or rectilinear portion thereof or has a recessed space formed to receive a user's hand. Moreover, since the handle switch of the tailgate is manufactured as a separate component from the tailgate and is then assembled in a design line, the assembly man-hour of the tailgate may be increased.

SUMMARY

An exemplary embodiment of the present invention is directed to a component-integrated tailgate handle switch capable of increasing a degree of freedom in design of a tailgate since the tailgate handle switch moves to a rear wiper, and particularly improving the aesthetics of the tailgate while reducing an assembly time since the tailgate handle switch is integrated with the wiper, and a vehicle having the same.

Other objects and advantages of the present invention may be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an exemplary embodiment of the present invention, a tailgate handle switch may include a handle switch housing having a transverse body, in which a coupling component may be arranged transversely, and a longitudinal body spaced apart from the coupling component while protruding at a right angle from the transverse body, wherein a switch operation surface may be pressed by a height of an insertion space defined by a difference in height between the transverse body and the longitudinal body in the handle switch housing.

The handle switch housing may be attached to a window glass or a black ceramic portion thereof. Additionally, the handle switch housing may have an integrated aperture formed therein, and the coupling component may be coupled to the handle switch housing through the integrated aperture. The handle switch housing may include upper and lower cases coupled to each other to define an internal space, provided with an insert member therein, and a switch accommodation space in which a current carrying switch may be positioned. The upper and lower cases may define the insertion space having the height to the switch accommodation space when coupled to each other. The lower case may include the switch operation surface allowing the current carrying switch to be pressed from the switch accommodation space.

The insert member may include a shaft guide boss withdrawn from the lower case to be positioned at a coupled portion of the coupling component, and a terminal guide boss coupled to a power terminal at a position in which the terminal guide boss is spaced apart from the shaft guide boss. The upper and lower cases and the insert member may be fixed by a fixing member, and the upper case may be coupled to the lower case by the fixing member. The upper case, the lower case, and the insert member may apply a case sealing member made of epoxy to a case sealing surface formed throughout a matching portion to each other. The current carrying switch may be accommodated in a switch boss formed in the insert member, and power may be applied by pressing and turning the current carrying switch on/off.

The handle switch housing may include a grommet coupled to the coupling component. The grommet may have a grommet body protruding from the handle switch housing in a direction opposite to the coupling component when the grommet is latched to the handle switch housing, and the grommet body may have a tapered aperture formed therein to allow the coupling component to be fitted into the tapered aperture. The grommet may have an extended flange formed in the grommet body, and the extended flange may be restricted by the internal space between the insert member and the upper case.

The grommet may be coupled to an assembly member, and the assembly member may have a guide bush coupled to a protruding shaft guide boss of the insert member to fit the grommet body to the guide bush to be surrounded by a lower end of the grommet body. The assembly member may include a mounting nut screwed to the guide bush to fix the handle switch housing, and a plurality of pads for relieving the screwing of the mounting nut to the guide bush.

In accordance with another exemplary embodiment of the present invention, a vehicle may include a tailgate handle switch having a handle switch housing, which has an internal space defined therein for accommodation of an insert member and a current carrying switch and may have a "T" shape by transverse and longitudinal bodies thereof, in which the current carrying switch may be pressed by a height of an insertion space defined by a difference in height between the transverse body and the longitudinal body, and a wiper having a wiper motor shaft, which has a blade end protruding to the transverse body through the internal space, and a blade which is coupled to the wiper motor shaft to be arranged transversely in the handle switch housing.

The tailgate handle switch and the wiper may be formed as a wiper-integrated tailgate handle switch positioned on a window glass of a tailgate. The tailgate handle switch may include a shaft guide boss and a terminal guide boss protruding from the handle switch housing, the shaft guide boss may be fitted to the window glass to allow the wiper motor shaft to pass through the tailgate and the window glass, and the terminal guide boss may be fitted to the window glass to couple a power terminal for supply of power to the current carrying switch to the tailgate.

Additionally, a switch pad may be positioned on a contact surface between the tailgate handle switch and the window glass, a window pad may be positioned in a space between the tailgate and the window glass, and each of the window pad and the switch pad may relieve shocks based on fastening of the tailgate handle switch.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

DETAILED DESCRIPTION

Figure 1:
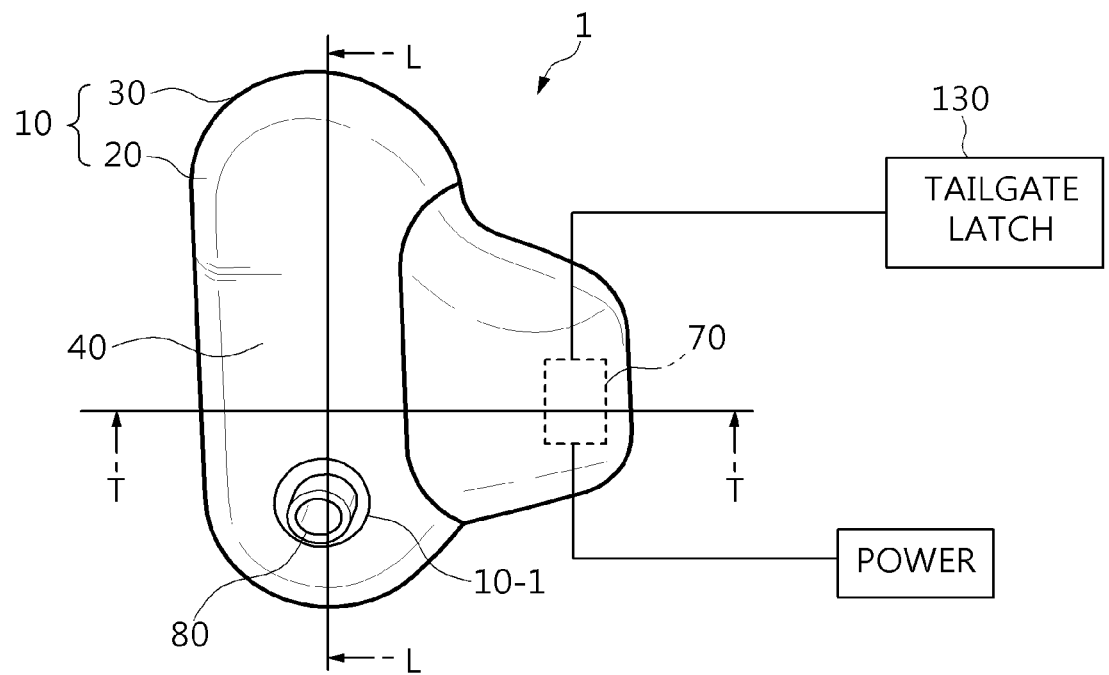
FIG. 1 is a view illustrating a component-integrated tailgate handle switch according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Exemplary embodiments of the present invention will be described below in more detail with reference to the accompanying drawings. The present invention may, however, be embodied in different forms and should not be construed as limited to the embodiments set forth herein. Rather, these exemplary embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 2:
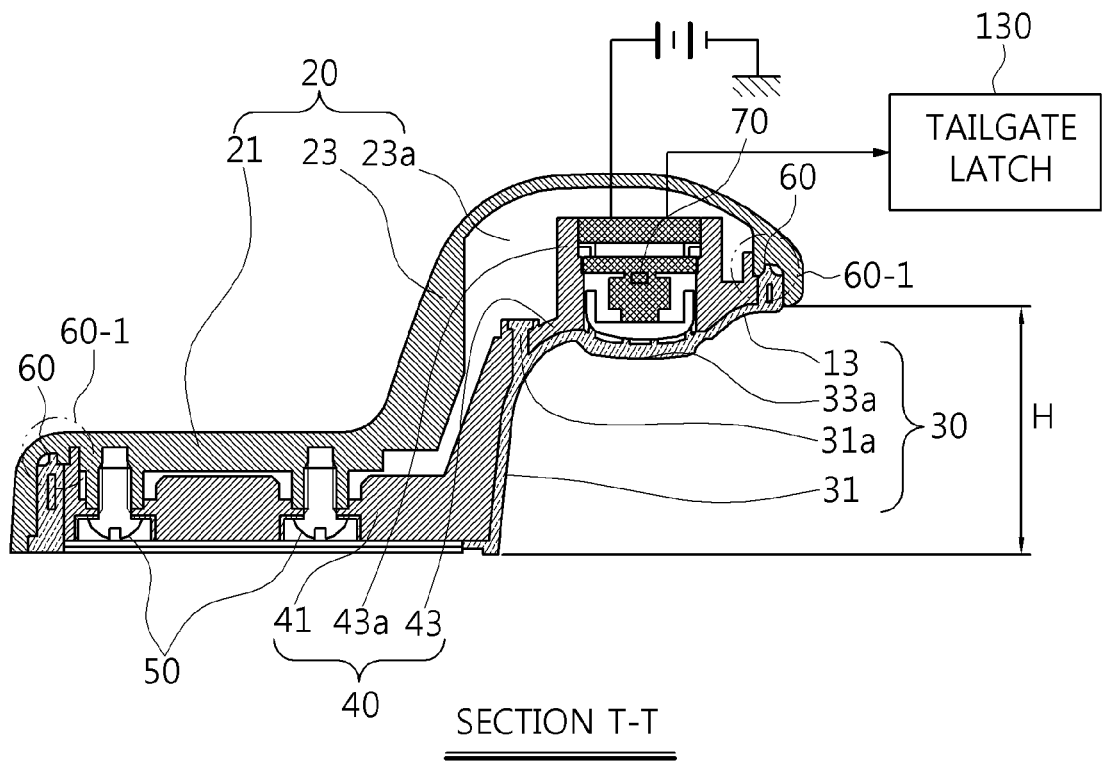
FIG. 2 is a longitudinal cross-sectional view illustrating the tailgate handle switch according to the exemplary embodiment of the present invention.
Figure 3:
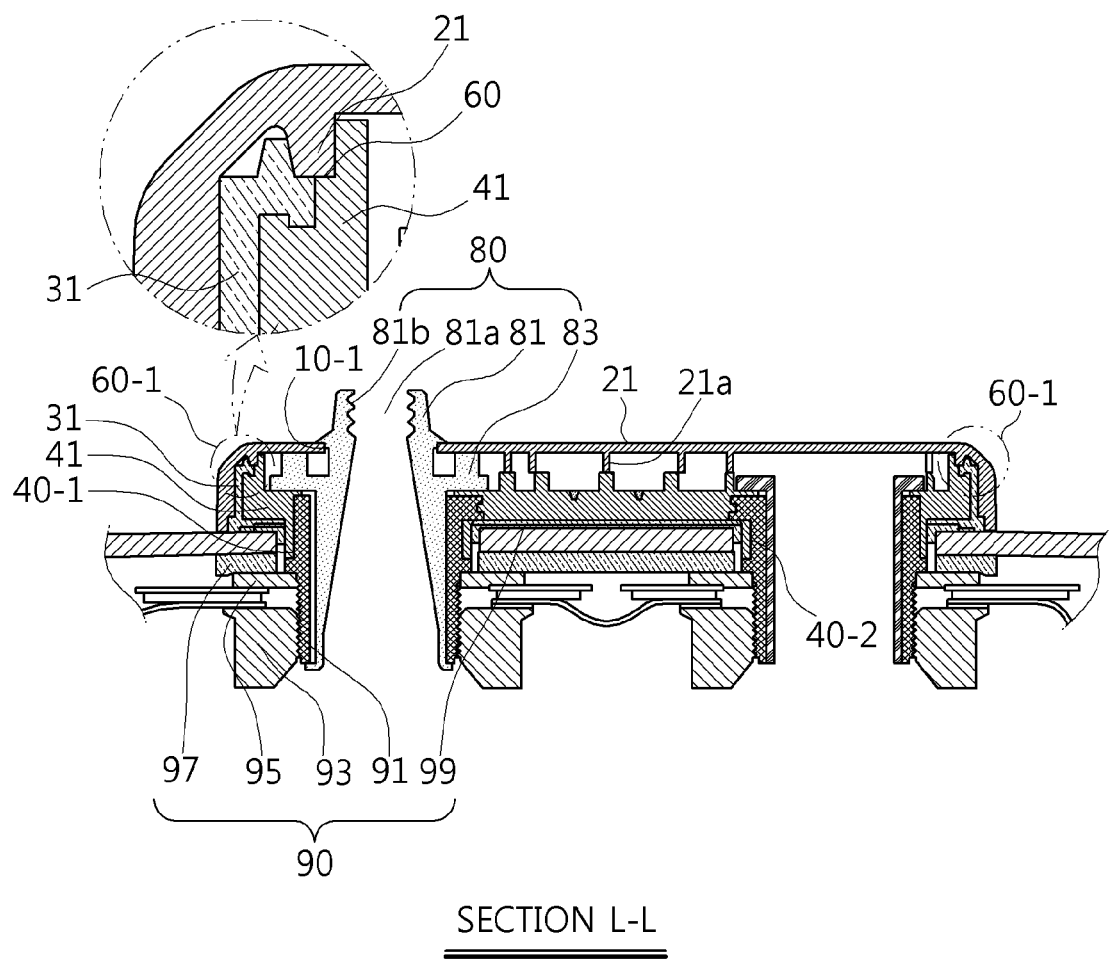
FIG. 3 is a transverse cross-sectional view illustrating the tailgate handle switch according to the exemplary embodiment of the present invention.

Referring to FIG. 1, a tailgate handle switch 1 may include a handle switch housing 10, an insert member 40, case fixing/sealing members 50 and 60 (see FIG. 2), a current carrying switch 70, a grommet 80, and an assembly member 90 (see FIG. 3). In particular, although the tailgate handle switch 1 is illustrated to open and close a tailgate latch 130, which is used to lock and unlock a tailgate, by turning the current carrying switch 70 on and off using power supplied from a battery of a vehicle. However, the present invention is not limited thereto and the present invention may use all types of switches operated by turning the current carrying switch 70 on and off.

The handle switch housing 10 may include a transverse body, in which an imaginary line L-L is drawn in the transverse direction, and a longitudinal body, in which an imaginary line T-T is drawn in the longitudinal direction, to have a substantially "T" shape, and the tailgate handle switch 1 thus has a "T"-type external appearance defined by the "T"-shaped handle switch housing 10. Particularly, the handle switch housing 10 may include an upper case 20 and a lower case 30 that are each made of plastic or urethane foam. The upper and lower cases 20 and 30 may be manufactured separately and then integrally coupled to each other, thereby defining an internal space.

In the "T"-shaped handle switch housing 10, a coupling component (e.g., wiper) is transversely arranged by the transverse body, and an insertion space is defined by a difference in height H between the transverse body and the longitudinal body that is spaced apart from the coupling component while protruding at a right angle from the transverse body (see FIG. 2). Thus, a user may press the current carrying switch 70 by inserting fingers into the insertion space.

The current carrying switch 70 may be disposed in the insert member 40. In particular, the insert member 40 may be coupled to the upper case 20 together with the case sealing member 60 while being coupled to the upper case 20 together with the lower case 30 by the case fixing member 50. The current carrying switch 70 may be disposed in the insert member 40 and in the internal space of the handle switch housing 10. The grommet 80 may be made of rubber or urethane foam. The grommet 80 may be fitted into an integrated aperture 10-1 of the upper case 20 to be exposed out of the handle switch housing 10.

FIG. 2 illustrates the detailed structure of the upper and lower cases 20 and 30 of the handle switch housing 10, the insert member 40, the case fixing member 50, the case sealing member 60, and the current carrying switch 70. In each of the upper and lower cases 20 and 30, a switch operation upper portion may be stepped from a mounting lower portion by the height H of the insertion space to press the current carrying switch 70 positioned at the switch operation upper portion. In other words, the switch operation upper portion may protrude out from the mounting lower portion by height H of the insertion space. The upper case 20 may be coupled to the insert member 40, the current carrying switch 70, and the grommet 80. The lower case 30 may be fixed to the upper case 20 by the case fixing member 50 while being coupled to the upper case 20 by the casing sealing member 60 for airtightness and waterproofing. Since the upper and lower cases 20 and 30 may be formed to have a "T" shape, the handle switch housing 10 formed by assembling the upper and lower cases 20 and 30 may also be formed to have a "T"-type external appearance.

Further, the upper case 20 may include an upper case transverse body 21 formed of a transverse body, in which the imaginary line L-L is drawn in the transverse direction, and an upper case longitudinal body 23 formed of a longitudinal body in which the imaginary line T-T is drawn in the longitudinal direction. The upper case transverse body 21 may include a fastening boss coupled to the case fixing member 50, the portion of which is formed with a plurality of ribs 21a (see FIG. 3) to reinforce the stiffness of the body. The upper case longitudinal body 23 may have a switch accommodation space 23a in which the current carrying switch 70 may be accommodated. Particularly, the upper case longitudinal body 23 that forms the switch operation upper portion may be stepped from the upper case transverse body 21, forming the mounting lower portion, by the insertion space height H. In other words, the upper case longitudinal body 23 may protrude from upper case transfer body 21 by the insertion space height.

The lower case 30 may include a lower case transverse body 31 formed of a transverse body, in which the imaginary line L-L is drawn in the transverse direction, and a lower case longitudinal body 33 formed of a longitudinal body in which the imaginary line T-T is drawn in the longitudinal direction, and may have a substantially uniform thickness. The lower case transverse body 31 may have a stepped fastening space through which the case fixing member 50 may pass and may also have an adhesive protrusion 31a that protrudes vertically to catch the insert member 40 for reinforcement of fixing force. The lower case longitudinal body 33 may include a switch operation surface 33a that protrudes convexly such that the current carrying switch 70 is turned on or off by pressing the switch operation surface 33a. Particularly, the lower case longitudinal body 33 forming the switch operation upper portion may be stepped from the lower case transverse body 31, forming the mounting lower portion, by the insertion space height H. In other words, the lower case longitudinal body 33 may protrude from the lower case transfer body 31 by the insertion space height.

The insert member 40 may include an insert transverse body 41 formed of a transverse body, in which the imaginary line L-L is drawn in the transverse direction, and an insert longitudinal body 43 formed of a longitudinal body in which the imaginary line T-T is drawn in the longitudinal direction. The insert transverse body 41 may have a portion formed with a seating surface for seating the fixing member 50 thereto. The insert longitudinal body 43 may include a switch boss 43a provided with the current carrying switch 70.

In addition, the insert transverse body 41 may include a shaft guide boss 40-1, which is coupled to the assembly member 90 to facilitate assembly work, and a terminal guide boss 40-2, which is spaced apart from the shaft guide boss 40-1 to facilitate the assembly work of connector components for supply of power. Particularly, the insert longitudinal body 43 that forms the switch operation upper portion may be stepped from the insert transverse body 41, that forms the mounting lower portion, by the insertion space height H. In other words, the insert longitudinal body 43 may protrude from insert transverse body 41 by the insertion space height.

Moreover, the case fixing member 50 may use a screw or a bolt together with a washer, and may be fastened to the stepped fastening space of the lower case transverse body 31, the seating surface of the insert transverse body 41, and the fastening boss of the lower case transverse body 31, with the consequence that the lower case 30 is integrally coupled to the upper case 20 to form the handle switch housing 10 when the insert member 40 and the current carrying switch 70 are disposed therein (e.g., when the insert member and current carrying switch are formed therein). The case sealing member 60 may be added to a portion in which the lower case 30 and the insert member 40 are pressed against the upper case 20, thereby reinforcing the airtight and waterproof effects of the handle switch housing 10 integrated by coupling the lower case 30 to the upper case 20.

The current carrying switch 70 may be accommodated in the handle switch housing 10 together with the insert member 40 using the switch boss 43a, thereby preventing the current carrying switch 70 from being exposed to the outside. The current carrying switch 70 may be turned on and off by pressing the switch operation surface 33a of the lower case 30 using the insertion space height H. For example, the tailgate latch 130 may be unlocked by applying power thereto when the current carrying switch 70 is turned on, whereas the tailgate latch 130 may be locked by cutting off power when the current carrying switch 70 is turned off.

FIG. 3 illustrates the detailed structure of the grommet 80 and the assembly member 90. Particularly, the grommet 80 may pass through the lower case 30, the insert member 40, and the upper case 20, with the consequence that, when the upper portion of the grommet 80 is withdrawn from the integrated aperture 10-1, the intermediate portion of the grommet 80 may be positioned in the space between the lower case 30 and the upper case 20 and the lower portion thereof is protected by the shaft guide boss 40-1 protruding from the insert transverse body 41 of the insert member 40.

The grommet 80 may include a grommet body 81 and an extended flange 83. The grommet body 81 may have a tapered aperture 81a formed therein, and the tapered aperture 81a has an enlarged structure in section from top to bottom when the bottom is set as an inlet through which a component (e.g., a wiper motor shaft) may be fitted to the grommet 80 and the top is set as an outlet through which the fitted component may be withdrawn. Particularly, the section of a grommet neck protrusion 81b is formed on the inner peripheral surface of the upper portion of the tapered aperture 81a to increase the adhesion with the fitted component. In addition, the grommet body 81 may have a grommet rib concentrically formed at the lower end thereof, and the grommet rib may have a substantial diameter. The grommet rib prevents the portion of the fitted component (e.g., the connection portion of the wiper motor shaft) and the portion of the lower case 30 from being stabbed (e.g., penetrated) when they are fastened by the mounting nut 93 of the assembly member 90.

The extended flange 83 may be formed around the intermediate portion of the grommet body 81 while having a predetermined height, and may be fixed between the insert transverse body 41 of the insert member 40 and the upper case transverse body 21 of the upper case 20 when withdrawn from the insert member 40. Therefore, the fixing force of the grommet 80 may be reinforced by adhesion formed between the insert member 40 and the upper case 20 by the extended flange 83. The extended flange 83 may be formed in the upper portion of the grommet body 81 such that the upper portion of the grommet body 81 withdrawn from the integrated aperture 10-1 may be pressed against the upper surface of the upper case 20.

The assembly member 90 may include a guide bush 91, a mounting nut 93, a washer 95, a window pad 97, and a switch pad 99. The guide bush 91 may have an external thread formed on the outer peripheral surface thereof and may be screwed to the mounting nut 93 having an internal thread formed on the inner peripheral surface thereof. The washer 95 may function as a bush to prevent the mounting nut 93 from being assembled too tightly to the guide bush 91. The window pad 97 may be added to the washer 95 to prevent damage to a counter component (e.g., a rear window glass) when the mounting nut 93 is assembled too tightly. The switch pad 99 may be added to the lower case transverse body 31 of the lower case 30 to prevent damage to a counter component (e.g., a window glass) when the mounting nut 93 is assembled too tightly. The assembly member 90 may be applied to the shaft guide boss 40-1 and the terminal guide boss 40-2 in the same manner.

Referring to the application structure of the case sealing member 60 in FIGS. 2 and 3, the case sealing member 60 may be applied to a case sealing surface 60-1 formed throughout a matching portion to prevent infiltration of water due to deformation of the matching portion. Although the case sealing member 60 may be made of epoxy, the case sealing member 60 may be made of any waterproof material that effectively prevents infiltration of water.

For example, FIG. 2 illustrates that the upper case longitudinal body 23 of the upper case 20, the lower case longitudinal body 33 of the lower case 30, and the insert longitudinal body 43 of the insert member 40, in which the imaginary line T-T is drawn in the longitudinal direction of the handle switch housing 10, form the case sealing surface 60-1 throughout the matching portion. FIG. 3 illustrates that the upper case transverse body 21 of the upper case 20, the lower case transverse body 31 of the lower case 30, and the insert transverse body 41 of the insert member 40, in which the imaginary line L-L is drawn in the transverse direction of the handle switch housing 10, form the case sealing surface 60-1 throughout the matching portion.

Hereinafter, an example in which the tailgate handle switch 1 of FIGS. 1 to 3 is applied to the tailgate of a hatchback vehicle will be described with reference to FIGS. 4 to 8. In particular, the hatchback vehicle is described as an example in FIGS. 4 to 8, and the tailgate handle switch 1, which is prevented from exposure to the outside or covered by coupling with other components, is functionally applicable to all vehicles, requiring an improvement in external appearance, and objects other than vehicles.

Figure 4:
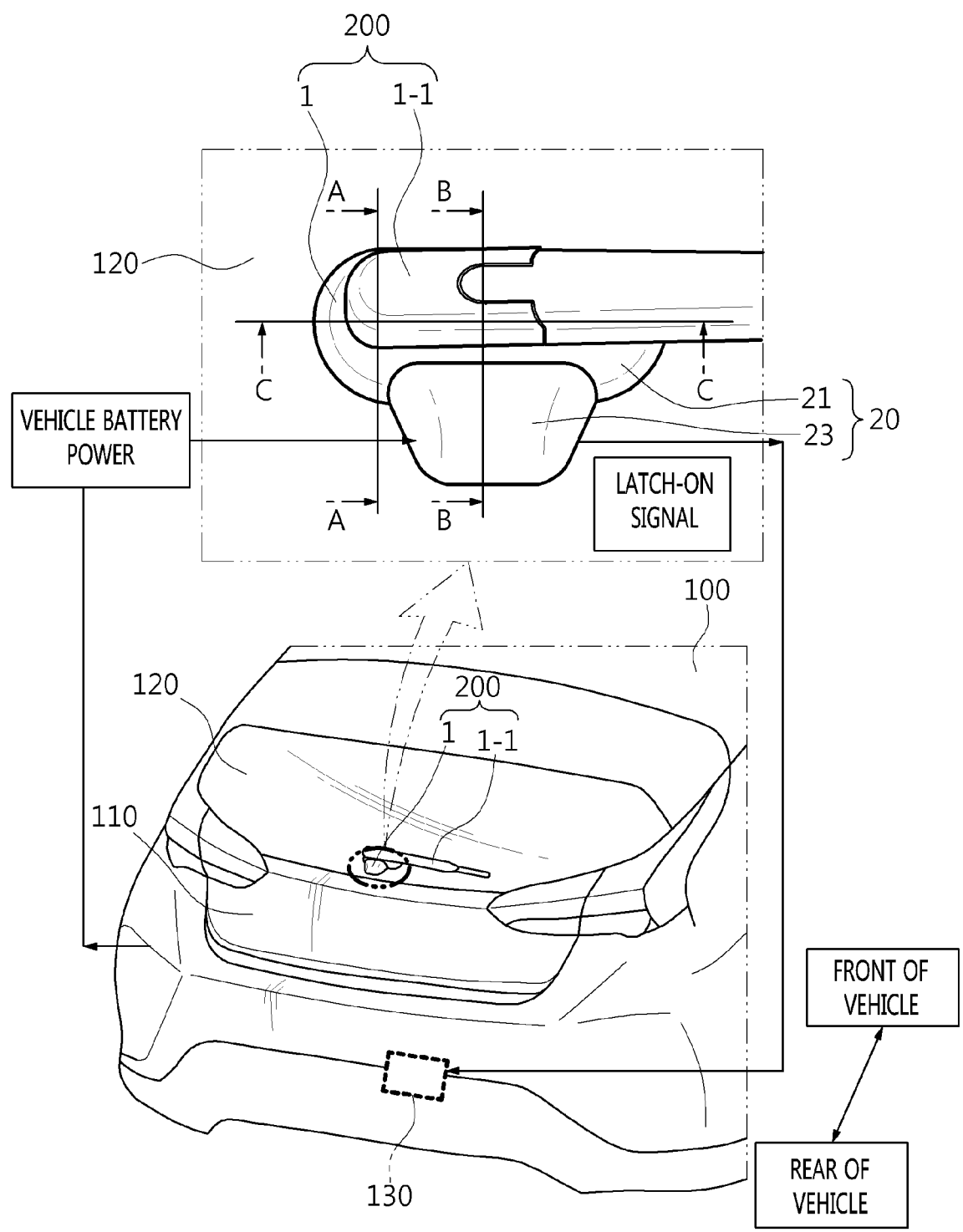
FIG. 4 is a view illustrating a vehicle having a component-integrated tailgate handle switch integrated with a rear wiper according to another exemplary embodiment of the present invention.

FIG. 4 illustrates an example of a wiper-integrated tailgate handle switch 200 installed in a vehicle 100. The vehicle 100 may include the wiper-integrated tailgate handle switch 200 coupled to a window glass 120 disposed along with a tailgate 110 that is opened and closed by the tailgate latch 130. In the wiper-integrated tailgate handle switch 200, since a handle switch housing 10 having a "T" shape by a transverse body and a longitudinal body is attached to the window glass 120 or the black ceramic portion thereof, the tailgate 110 may exhibit an improved aesthetic by the wiper-integrated tailgate handle switch 200.

The wiper-integrated tailgate handle switch 200 may include a tailgate handle switch 1 and a wiper 1-1. To turn the tailgate handle switch 1 on and off and operate the wiper 1-1, the vehicle 100 may include a battery and an electric circuit and power may be supplied from the battery. The tailgate latch 130 may be a typical component to unlock and lock the tailgate 110 as known in the related art, but the tailgate late 130 may unlock the tailgate 110 in response to the latch-ON signal when the tailgate handle switch 1 is turned on.

The tailgate handle switch 1 may have a transverse space, defined by the upper case transverse body 21 of the upper case 20 forming the handle switch housing 10, and a longitudinal space defined by the upper case longitudinal body 23. Therefore, the tailgate handle switch 1 allows the wiper 1-1 to be transversely arranged using the upper case transverse body 21 and allows the latch-ON signal transmitted to the tailgate latch 130 to be generated by pressing the current carrying switch 70 using the upper case longitudinal body 23. Accordingly, the tailgate handle switch 1 is the same as the tailgate handle switch 1 described with reference to FIGS. 1 to 3.

Figure 5:
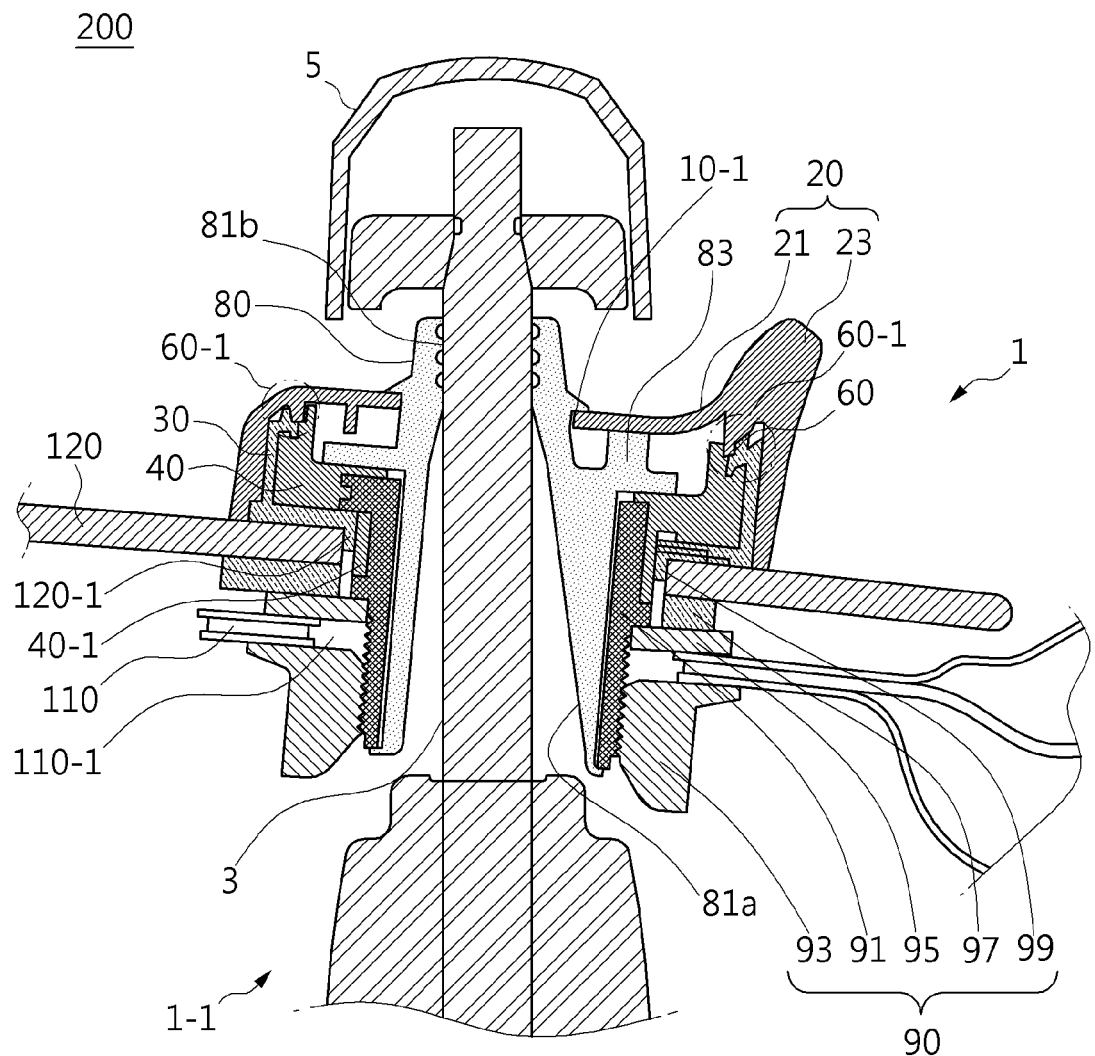
FIG. 5 is a longitudinal cross-sectional view illustrating the tailgate handle switch and a shaft coupling part of the rear wiper according to the exemplary embodiment of the present invention.
Figure 6:
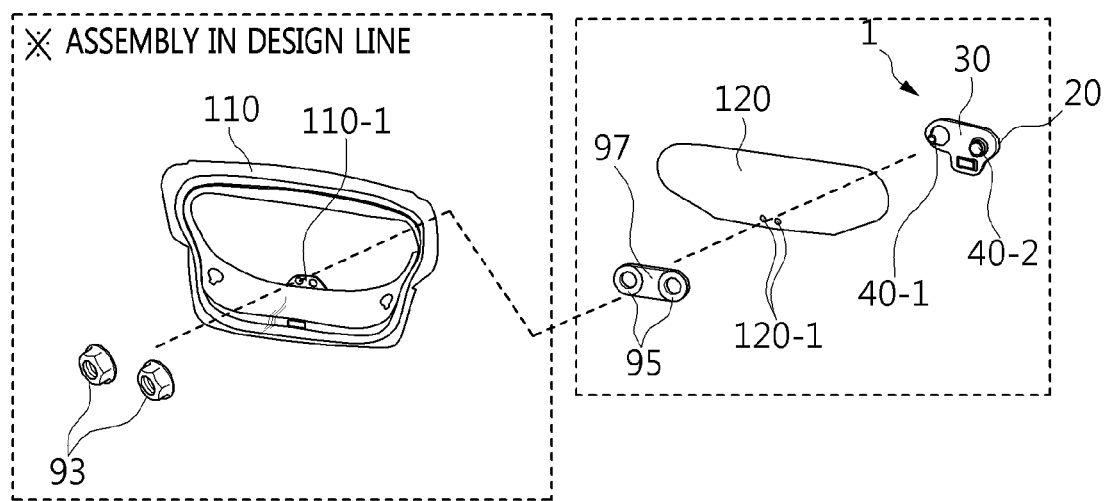
FIG. 6 is a view illustrating an assembly process in which the tailgate handle switch is coupled to a tailgate and a window glass by an assembly member according to the exemplary embodiment of the present invention.
Figure 7:
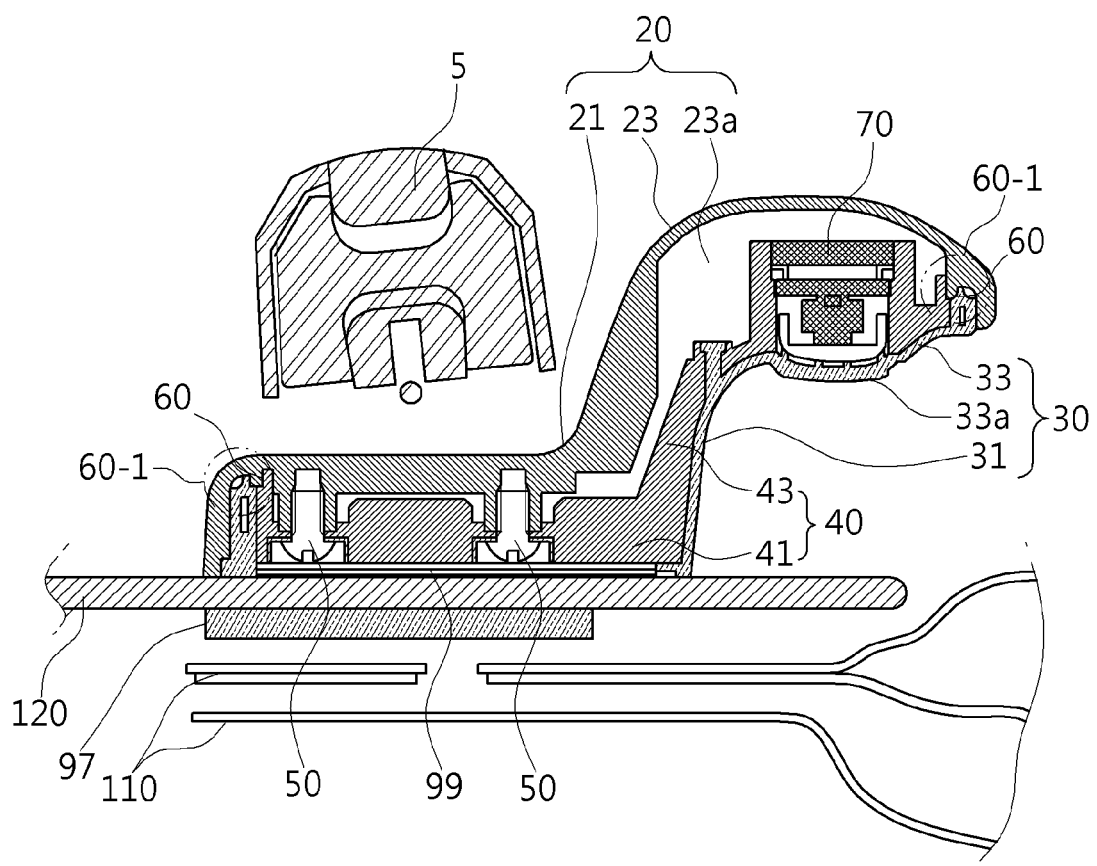
FIG. 7 is a longitudinal cross-sectional view illustrating an operation part of the tailgate handle switch and the rear wiper according to the exemplary embodiment of the present invention.

FIGS. 5 to 7 illustrate a cross-sectional structure in which the wiper 1-1 including a wiper motor shaft 3 and a blade 5 is coupled to the tailgate handle switch 1 through the integrated aperture 10-1 of the handle switch housing 10. FIG. 5 is a cross-section view taken along line A-A of FIG. 4. The handle switch housing 10 may include the insert member 40 in the upper and lower cases 20 and 30, and may be coupled to the switch pad 99 together with the guide bush 91 of the assembly member 90 surrounding the grommet 80 and the lower section thereof.

Accordingly, in the handle switch housing 10, the case sealing member 60 applied to the case sealing surface 60-1 of the upper and lower cases 20 and 30 and the insert member 40 provides airtightness and waterproofing. The grommet 80 may be fixed in the handle switch housing 10 through the space between the upper case 20 and the insert member 40 pressed against the extended flange 80 and the integrated aperture 10-1 from which the grommet body 81 is withdrawn. The guide bush 91 may be coupled by fitting of the insert member 40 into the shaft guide boss 40-1. The switch pad 99 fitted to the shaft guide boss 40-1 may be coupled to the lower case 30.

When the handle switch housing 10 is coupled to the window glass 120, the shaft guide boss 40-1 of the insert member 40 may be fitted into the window aperture 120-1 of the window glass 120 to position the handle switch housing 10 outside the window glass 120, whereas the guide bush 91 may be positioned inside the tailgate 110 through the mounting boss 110-1 formed in the tailgate 110 within the window glass 120. Thus, the wiper motor shaft 3 of the wiper 1-1 may be coupled to the grommet 80 by fitting into the tapered aperture 81a of the grommet body 81. The switch pad 99 pressed against the surface of the window glass 120 may prevent a scratch on the window glass and absorb shocks.

When the handle switch housing 10 is coupled to the window glass 120, the mounting nut 93, the washer 95, the window pad 97, and the switch pad 99 of the assembly member 90 may be fastened thereto as shown in FIG. 6. The window pad 97 may be inserted into the mounting boss 110-1 to be pressed against the window glass 120 through the guide bush 91, and the washer 95 may be inserted into the mounting boss 110-1 to be pressed against the window glass 120 through the guide bush 91. Therefore, the window pad 97 and the washer 95 may be positioned in the space between the tailgate 110 and the window glass 120. The mounting nut 93 may be screwed to the guide bush 91 that protrudes inward of the tailgate 110 to fix the guide bush 91. Thus, the handle switch housing 10 may be fixed to the window glass 120 by screwing of the guide bush 91 to the mounting nut 93.

Further, the wiper 1-1 may be coupled to the handle switch housing 10 while separated from the wiper motor shaft 3 and the blade 5. The wiper motor shaft 3 may be fitted into the tapered aperture 81 of the grommet 80 surrounded by the guide bush 91 in the tailgate 110, and the wiper motor shaft 3 may be pushed to the window glass 120 to withdraw the blade end as the end of the wiper motor shaft 3 from the tapered aperture 81a. In particular, the blade end of the wiper motor shaft 3 may be pressed against the grommet neck protrusion 81b formed on the inner peripheral surface of the tapered aperture 81a. The grommet rib at the lower end of the grommet body 81 surrounds the end of the guide bush 91 in the state in which the grommet 80 is coupled to the guide bush 91, thereby preventing the mounting nut from being stabbed by the wiper motor shaft 3 when the wiper 1-1 is coupled to the handle switch housing 10.

The assembly of the wiper 1-1 to the handle switch housing 10 may be completed by assembling the blade 5 to the blade end of the wiper motor shaft 3 when the blade end protrudes from the handle switch housing 10. As a result, the tailgate handle switch 1 may be assembled to the wiper 1-1 by coupling of the grommet 80 to the wiper motor shaft 3, thereby forming the wiper-integrated tailgate handle switch 200.

FIG. 7 is a cross-sectional view taken along line B-B of FIG. 4, and illustrates the handle switch housing 10 fixed by fastening or screwing the upper case 20 to the lower case 30 using the fixing member 50. In addition, the handle switch housing 10 comes into contact with the surface of the window glass 120 through the switch pad 99 added to the lower case 30. Moreover, the handle switch housing 10 may be positioned in the switch accommodation space 23a of the upper case 20 in the state in which the current carrying switch 70 is accommodated in the switch boss 43a of the insert member 40. In particular, since the blade 5 of the wiper 1-1 is positioned at the upper case transverse body 21 of the upper case 20, the current carrying switch 70 may be operable without interference with the blade 5 in the upper case longitudinal body 23 of the upper case 20 in the handle switch housing 10.

Figure 8:
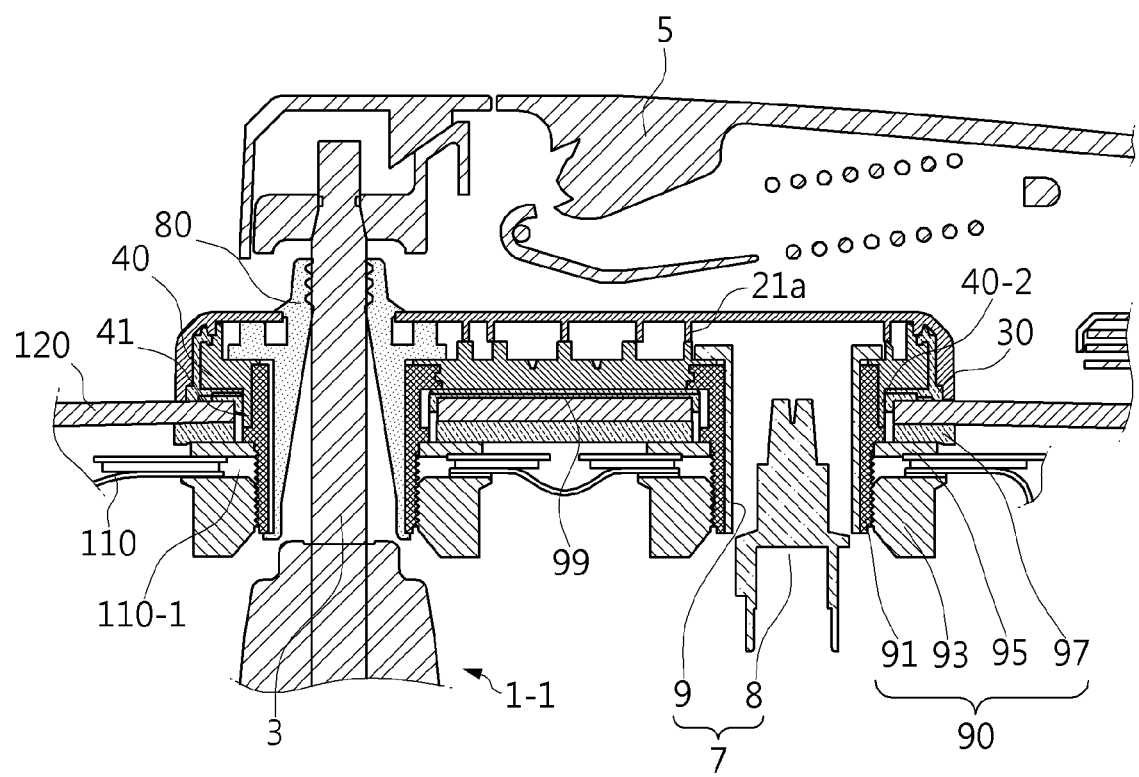
FIG. 8 is a transverse cross-sectional view illustrating the tailgate handle switch and the rear wiper according to the exemplary embodiment of the present invention.

FIG. 8 is a cross-sectional view taken along line C-C of FIG. 4, and illustrates that the power terminal 7 may be installed in the handle switch housing 10 together with the assembly member 90 using the terminal guide boss 40-2 adjacent to the shaft guide boss 40-1 of the insert member 40. The power terminal 7 may include a power connector 8 and a connector bush 9. The assembly member 90 may include a guide bush 91, a mounting nut 93, a washer 95, and a window pad 97.

Particularly, the guide bush 91 of the assembly member 90 may be coupled to the terminal guide boss 40-2. Additionally, the window pad 97 and the washer 95, which are inserted into the mounting boss 110-1 of the tailgate 110 to pass through the guide bush 91, may be positioned in the space between the tailgate 110 and the window glass 120. The mounting nut 93 may be fastened or screwed to the guide bush 91 protruding inward of the tailgate 110 to fix the guide bush 91. The connector bush 9 of the power terminal 7 may be coupled into the guide bush 91, and the power connector 8 may be fitted to the connector bush 9 to be connected to the electric circuit leading to the current carrying switch 70, although not illustrated in the drawing. Therefore, the power terminal 7 may be maintained in the stably coupled state by the assembly member 90 while supplying power from the battery to the current carrying switch 70.

As described above, the vehicle according to the exemplary embodiment of the present invention may include the wiper-integrated tailgate handle switch 200 mounted to the window glass 120 of the tailgate 110. The wiper-integrated tailgate handle switch 200 may include the tailgate handle switch 1, which has a "T" shape by the transverse and longitudinal bodies of the handle switch housing 10 and may be configured to press the current carrying switch 70 arranged in the internal space thereof using the height of the insertion space defined by the difference in height H between the transverse body and the longitudinal body, and the wiper 1-1 including the blade coupled to the wiper motor shaft 3 passing through the handle switch housing 10 and may be transversely arranged in the handle switch housing 10. Therefore, it may be possible to increase the degree of freedom in design of the tailgate 110, to also improve the aesthetics of the tailgate 110, by removing the tailgate handle switch 1 from the tailgate 110. Particularly, since the tailgate handle switch 1 may be integrated with the wiper 1-1, it may be possible to reduce an assembly time.

As is apparent from the above description, since the tailgate handle switch of the present invention may be connected to the rear wiper positioned to the rear window, the handle switch may be operated from the outside without using the tailgate. Particularly, since the tailgate handle switch may be integrated with the rear wiper, the present invention has an effect in that a separate occupied space for the tailgate may be omitted in the state in which the tailgate handle switch is covered by the wiper and exposed to the outside.

In addition, since the vehicle of the present invention has the component-integrated tailgate handle switch applied to the tailgate, it may be possible to significantly increase the degree of freedom in design of the tailgate. Particularly, since the existing protrusion or recessed portion formed in the tailgate may be removed by the tailgate handle switch positioned to the rear window together with the rear wiper, it may be possible to improve the aesthetic image of the tailgate. Furthermore, the tailgate is a module component integrated with the rear window glass and has the handle switch integrated with the rear wiper in the complete vehicle. Therefore, the present invention has an effect of reducing an assembly man-hour in the design line since the nut is fastened at two positions.

While the present invention has been described with respect to the specific exemplary embodiments, it will be apparent to those skilled in the art that various changes and modifications may be made without departing from the spirit and scope of the invention as defined in the following claims.

What is claimed is:

1. A tailgate handle switch, comprising:
a handle switch housing integrated with a wiper,
wherein the wiper includes a blade and a wiper motor shaft, and
wherein the handle switch housing is attached to a window glass, and
wherein the wiper motor shaft has a blade end protruding out of the handle switch housing through an internal space of the handle switch housing, and the blade is coupled to the wiper motor shaft by the blade end to be arranged transversely in the handle switch housing.

2. The tailgate handle switch of claim 1, wherein the handle switch housing includes:
a transverse body, in which a coupling component is arranged transversely; and
a longitudinal body spaced apart from the coupling component while protruding at a right angle from the transverse body,
wherein a switch operation surface is pressed by a height of an insertion space defined by a difference in height between the transverse body and the longitudinal body in the handle switch housing.

3. The tailgate handle switch of claim 2, wherein the handle switch housing has an integrated aperture formed therein, and the coupling component is coupled to the handle switch housing through the integrated aperture.

4. The tailgate handle switch of claim 2, wherein:
the handle switch housing includes an upper case and a lower case coupled to each other to define an internal space, provided with an insert member therein, and a switch accommodation space in which a current carrying switch is positioned;
the upper case and the lower case define the insertion space having the height to the switch accommodation space in a state in which the upper case and lower case are coupled to each other; and
the lower case has the switch operation surface allowing the current carrying switch to be pressed from the switch accommodation space.

5. The tailgate handle switch of claim 4, wherein the insert member includes:
a shaft guide boss withdrawn from the lower case to be positioned at a coupled portion of the coupling component; and
a terminal guide boss coupled to a power terminal at a position in which the terminal guide boss is spaced apart from the shaft guide boss.

6. The tailgate handle switch of claim 4, wherein the upper case and the lower case and the insert member are fixed by a fixing member, and the upper case is coupled to the lower case by the fixing member.

7. The tailgate handle switch of claim 4, wherein the upper case and the lower case and the insert member apply a case sealing member to a case sealing surface formed throughout a matching portion to each other.

8. The tailgate handle switch of claim 7, wherein the case sealing member is made of epoxy.

9. The tailgate handle switch of claim 4, wherein the current carrying switch is accommodated in a switch boss formed in the insert member, and power is applied by pressing and turning the current carrying switch on and off.

10. The tailgate handle switch of claim 4, wherein the handle switch housing includes a grommet coupled to the coupling component.

11. The tailgate handle switch of claim 10, wherein the grommet includes a grommet body protruding from the handle switch housing in a direction opposite to the coupling component when the grommet is latched to the handle switch housing, and the grommet body has a tapered aperture formed therein to fit the coupling component into the tapered aperture.

12. The tailgate handle switch of claim 11, wherein the grommet has an extended flange formed in the grommet body, and the extended flange is restricted by the internal space between the insert member and the upper case.

13. The tailgate handle switch of claim 11, wherein the grommet is coupled to an assembly member, and the assembly member includes a guide bush coupled to a protruding shaft guide boss of the insert member to fit the grommet body to the guide bush.

14. The tailgate handle switch of claim 13, wherein an end of the guide bush is surrounded by a lower end of the grommet body.

15. The tailgate handle switch of claim 13, wherein the assembly member is screwed to the guide bush by a mounting nut.

16. The tailgate handle switch of claim 15, wherein the screwing of the assembly member to the guide bush by the mounting nut is relieved by a pad.

17. The tailgate handle switch of claim 1, wherein a switch pad is positioned on a contact surface between the handle switch housing and the window glass, a window pad is positioned in a space between a tailgate and the window glass, and each of the window pad and the switch pad relieves shock generated during fastening of the handle switch housing.

* * * * *